Jan. 26, 1960

F. DE BUIGNE 2,922,505

INDEXING TABLE

Filed March 18, 1954

INVENTOR.
FRANK DE BUIGNE
BY
Jay C. Taylor
ATTORNEY

Jan. 26, 1960   F. DE BUIGNE   2,922,505
INDEXING TABLE
Filed March 18, 1954   5 Sheets-Sheet 2

INVENTOR.
FRANK DE BUIGNE
BY
Jay C. Taylor
ATTORNEY

INVENTOR.
FRANK DE BUIGNE
BY Jay C. Taylor
ATTORNEY

Jan. 26, 1960

F. DE BUIGNE 2,922,505

INDEXING TABLE

Filed March 18, 1954

INVENTOR.
FRANK DE BUIGNE
BY Jay C. Taylor
ATTORNEY

Jan. 26, 1960   F. DE BUIGNE   2,922,505
INDEXING TABLE

Filed March 18, 1954   5 Sheets-Sheet 5

United States Patent Office 2,922,505
Patented Jan. 26, 1960

2,922,505

INDEXING TABLE

Frank De Buigne, Birmingham, Mich., assignor to La Salle Tool, Inc., Detroit, Mich., a corporation of Michigan Application March 18, 1954, Serial No. 416,992

9 Claims. (Cl. 192—139)

This invention relates to an indexing table of the type having a rotatable work carrying top or drum adapted to be successively indexed through predetermined increments of rotation to carry work pieces thereon to successive work stations.

A common objection to such tables arises from the problem of rapidly starting and stopping the rotation of heavy table tops. Various types of cams, such as Geneva type cams, have been employed heretofore in attempts to meet the problem, but no solution advanced heretofore has been entirely satisfactory. The rates of acceleration and deceleration effected by the Geneva type cam for example are objectionably high and result in a suddenness of starting and stopping which frequently damages the indexing mechanism. Also with such cams, a materially different starting and stopping condition exists depending upon the number of indexing movements that are required within one complete revolution of the top, necessitating a complete change of the cams in order to modify the indexing pattern.

It is an important object of the present invention to provide an improved indexing table including highly efficient and comparatively simple means for indexing the rotatable top, whereby rotation of the latter is started and stopped with optimum operating smoothness, the top being gradually accelerated from its rest or indexed position to the desired indexing speed and thereafter gradually decelerated and finally stopped at the next successive indexed position without appreciable impact between the driving and driven parts of the indexing mechanism and top.

Another object is to provide an indexing table of the foregoing character wherein each indexing movement is accomplished by one complete rotation of a table driving or indexing gear meshed with an internal ring gear coaxial with the top and keyed thereto, the indexing mechanism being operatively coupled with the shaft of the indexing gear to rotate the latter through one complete revolution for each complete operating cycle of the indexing mechanism.

Accordingly the length of the arc of indexing movement of the table top is determined by the relative dimensions of the indexing and ring gears, rather than the indexing mechanism, so that no modification of the latter is necessary to change the indexing arc of the table top. By virtue of such a construction, it is only necessary to replace the indexing and ring gears by corresponding gears of different sizes in order to change the indexing pattern of the top. Likewise, regardless of the indexing pattern, the rate of acceleration or deceleration of the indexing gear will depend entirely upon its angular position, as determined by the position of the indexing mechanism in its operating cycle.

Another object is to provide power governor means in cooperation with the indexing mechanism so that, when the table mechanism is at rest at an indexed position and the operating power for an indexing movement is initially turned on, only a predetermined small amount of indexing power is effective to operate the indexing mechanism. The latter thus operates at a slow speed throughout a predetermined phase of operation comprising an initial dwell phase, during which the top remains at the indexed position and a locating member ordinarily positively interlocked with the top at the indexed position is withdrawn from engagement with the top, thereby to free the top for indexing movement. During the initial dwell phase, the governor means operates to increase the indexing power gradually, thereby to increase the rate of operation of the indexing mechanism. Upon completion of the initial dwell phase, and while the indexing power is still low, the indexing mechanism operates to accelerate the table driving or indexing gear, gradually at first, then more rapidly as the top gains momentum, then slowly as rotation of the top approaches the desired indexing speed. During approximately the same time, the governor means also gradually increases the indexing power, thereby to increase the speed of operation of the indexing mechanism gradually, whereby the top is brought smoothly from the rest condition to the desired indexing speed. Thereafter the indexing power remains constant and the indexing mechanism rotates the top at uniform speed to a predetermined position near the end of the indexing movement, whereat the governor means operates to reduce the indexing power gradually. At approximately the same time, the indexing mechanism operates to decelerate the top, gradually at first, then more rapidly, then finally slowly until the table stops smoothly at its indexed position. The indexing mechanism continues to operate throughout a final dwell phase at the aforesaid predetermined slow speed permitted by the power governor means. During the final dwell phase, the top is at rest and the locating member is moved into positive interlocking engagement with the top to lock the same at the indexed position. Thereafter the indexing power is shut off completely to complete the cycle.

Other objects of this invention will appear in the following description and appended claims, reference being had to the accompanying drawings forming a part of this specification wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
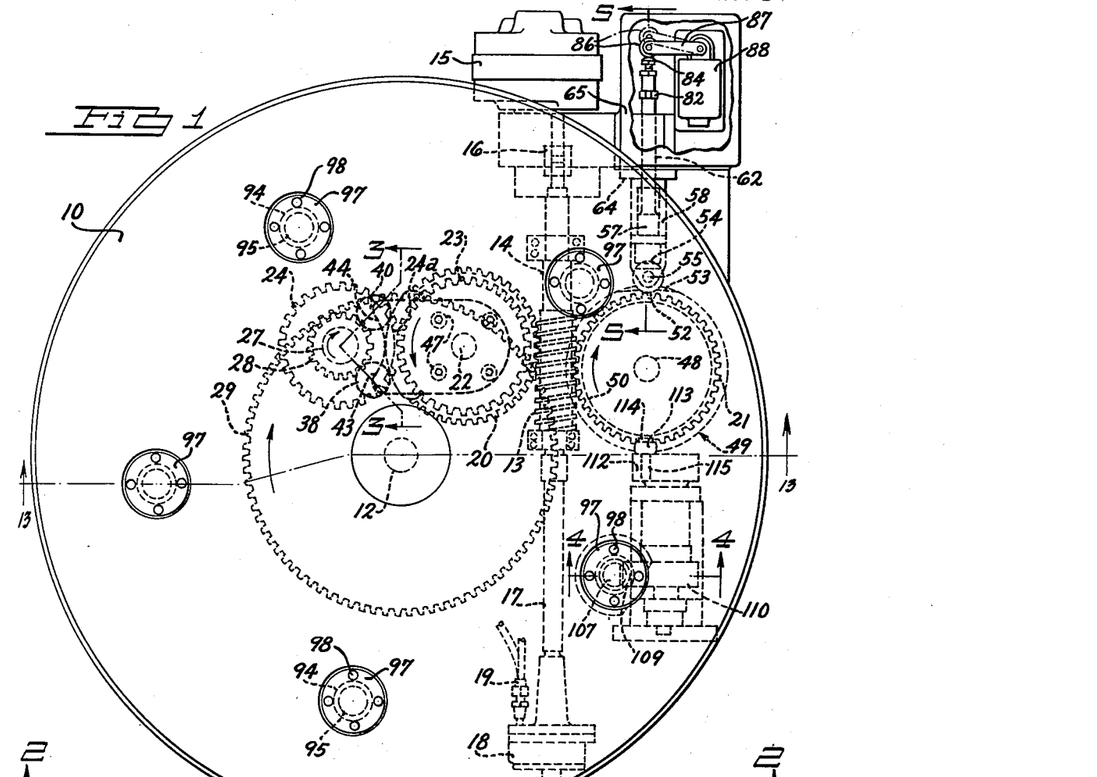
Fig. 1 is a fragmentary plan view showing an indexing table embodying the present invention.

Referring in more particularity to the drawings, a preferred embodiment of the present invention is illustrated comprising a rotatable table or work carrying drum 10 mounted on a frame or base 11 to rotate about a central upright shaft 12. Power operated means for rotating the table 10 includes a horizontal worm gear 13 keyed to a coaxial drive shaft 14 suitably supported by bearings mounted in frame 11 as indicated in Fig. 1. The shaft 14 is rotated by a hydraulic motor 15 and is connected by a flexible coupling 16 with the rotatable shaft of the motor 15. The latter is suitably connected with a source of hydraulic fluid pressure and operated as described in more detail below. Extending coaxially forward from the gear 13 and splined thereto is a drive shaft 17 connected with a hydraulic pump 18 to operate the latter upon rotation of shaft 14, thereby to lubricate the table drive mechanism by means of a lubricating conduit system 19.

Figure 2:
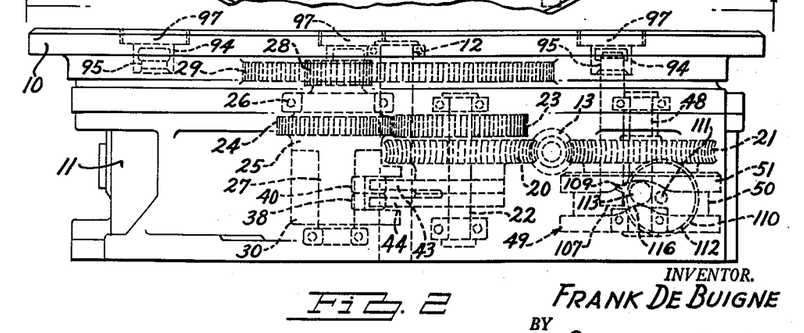
Fig. 2 is an elevational view of Fig. 1, taken in the direction of the arrows along the line 2—2 of Fig. 1.

Meshed with the gear 13 at its opposite sides are inner and outer horizontal gears 20 and 21, the former being keyed to a coaxial vertical shaft 22 suitably supported above and below the gear 20 by bearings mounted in the frame 11 as indicated in Fig. 2. Splined coaxially on shaft 22 to rotate therewith is a driving gear 23, located in the present instance immediately above the gear 20 and in the plane of a sector gear 24. The latter has a toothed arc adapted to mesh with the teeth of the driving gear 23 to be rotated thereby until a blank or toothless arc 24a of the sector gear 24 is rotated to the region of mesh, Figs. 1 and 7.

The hub 25 of sector gear 24 is supported above by a bearing 26 mounted in the frame 11 and is keyed to a coaxial vertical shaft 27 journaled at its lower end in a bearing mounted in the frame 11, Fig. 2. Keyed coaxially on an upper extension of the shaft 27 above the bearing 26 is a table driving or indexing gear 28 in mesh with the interior teeth of a ring gear 29 secured to the drum or top 10 to rotate coaxially therewith. By virtue of the interengagement between the indexing gear 28 and interior teeth of the ring gear 29, backlash or overriding of the top 10 with respect to the indexing gear 28 is minimized.

Below the hub 25 and suitably secured thereto as for example by being bolted thereto is a pin supporting hub or block 30 machined to support a pair of generally vertical cylindrical roller supporting pins 31 and 32 at arcuately spaced locations, Fig. 3. The pins 31 and 32 are substantially identical in shape but are inverted with respect to each other, the pin 31 having an upper enlarged cylindrical body portion snugly within an upper bore 33 in the block 30. Similarly the pin 32 is provided with a lower enlarged body portion fitting snugly within a lower bore 34 in the block 30. A lower bore 35 coaxial with bore 33 is provided in the block 30 to receive a lower extension of the pin 31 of reduced diameter. Similarly an upper bore 36 is provided in the block 30 coaxially with the bore 34 to receive an upper extension of reduced diameter of the pin 32.

At the region of the lower reduced extension of pin 31, the block 30 is provided with a radially outward opening recess 37 dimensioned to receive a lower horizontal cam follower 38 journaled on said lower reduced extension and confined against axial displacement between the lower surface of recess 37 and the annular shoulder at the juncture between the reduced and enlarged body portions of the pin 31. Similarly a radially outward opening recess 39 is provided in the block 30 at the region of the upper reduced extension of the pin 32 for a horizontal cam follower 40 journaled on the latter reduced extension and confined against axial displacement between the upper surface of the recess 39 and the annular shoulder at the juncture between the reduced and enlarged portions of the pin 32. Above the cam follower 38 and below the cam follower 40, the enlarged body portions of the pins 31 and 32 are recessed at 41 and 42 respectively to provide radial outward opening notches for passage of upper and lower cams 43 and 44 respectively, as described below. Radial locking pins 45 and 46 extend through the block 30 from the shaft 27 and partially into the lower portions of the pins 31 and 32 respectively.

By the structure described, prior to assembly of the block 30 on the shaft 27, the pin 31 is inserted from above into the bore 33, through cam follower 38, and into bore 35. The pin 32 is inserted from below into the bore 34, through cam follower 40, and into bore 36. The pins 45 and 46 are then inserted radially through block 30 from the interior thereof and seated within their respective pins 31 and 32, whereat the pins 45 and 46 are blocked against radial outward movement by abutment of their radial outer ends with portions of the pins 31 and 32, Fig. 3. Thereafter the block 30 with the assembled pins 31, 32 and cam followers 38, 40 is sleeved onto the shaft 27 and bolted firmly to the hub 25, locking the radial pins 45 and 46 in position and thereby positively holding the pins 31 and 32 in fixed relation with respect to the block 30.

The cams 43 and 44 are substantially identical in shape and are secured in inverted relation with respect to each other to the under side of the hub of gear 20 at the levels of the cam followers 40 and 38 respectively by bolts 47. As illustrated in the operational views 7 through 10, wherein the driving gear 23 is assumed to be rotating counterclockwise, the cam 43 comprises a blocking cam engageable with the upper roller 40 and adapted to pass freely through the notch 41. Adjacent the leading edge of cam 43 is a radial blocking extension 43a which converges radially and clockwise inwardly to an intermediate locking portion 43b concentric with the driving gear 23. The portion 43b terminates in an inwardly curving blocking shoulder 43c adjacent the trailing edge of cam 43.

The cam 44 comprises a driving cam engageable with the lower cam follower 38 and adapted to pass freely through the notch 42. The cam 44 is provided at its leading edge with a rounded driving shoulder 44c which curves radially outward and clockwise to an intermediate locking portion 44b concentric with the driving gear 23. The portion 44b terminates in a radial driving extension 44a adjacent the trailing edge of cam 44.

In Fig. 1, the mechanism is shown with the top 10 at one of the indexed positions, whereat the sector gear 24 is locked at a rest or dwell position by virtue of the cam followers 38 and 40 in tangential rolling engagement with the locking surfaces 44b and 43b respectively. Also at the position of Fig. 1, the toothed arc of the sector gear 24 is out of mesh with the driving gear 23 and the toothless arc 24a is centered at the region of mesh. Thus, as determined by the lengths of the arcuate intermediate locking portions 43b and 44b, a limited amount of rotation of the driving gear 23 in either direction from the position of Fig. 1 is permitted independently of movement of the sector gear 24. During such limited movement, the radial projections 43a and 44a pass freely through the notches 41 and 42 respectively.

Figure 7:
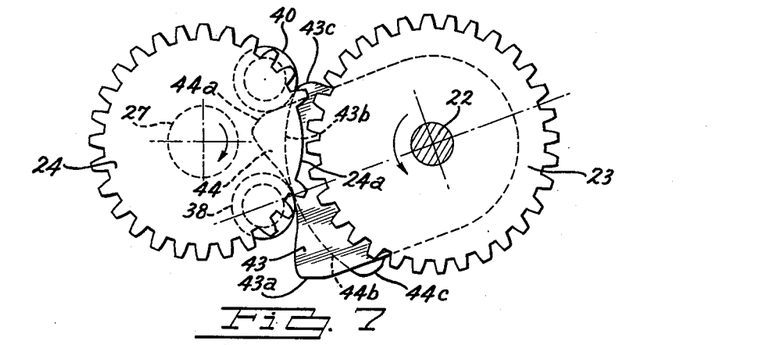
Fig. 7 is an operational plan view of the sector gear driving mechanism, showing the relationship of the parts at the beginning of movement of the sector gear from the dwell or rest position of Fig. 1.

Upon counterclockwise rotation of driving gear 23 from the position of Fig. 1 to approximately the position of Fig. 7, the cam follower 38 is engaged by the leading edge of the driving projection 44a, causing clockwise rotation of the sector gear 24 from its rest position. The curvature of the driving projection 44a is determined so that as the latter engages the cam follower 38, the speed of rotation of the sector gear 24 is accelerated gradually as it is moved from its rest position to the position of Fig. 8. At the latter position the leading end of the toothed arc of sector gear 24 is adjacent its initial position in mesh with the teeth of the driving gear 23 and the driving projection 44a leaves the cam follower 38. Thereafter the driving gear 23 and sector gear 24 rotate in mesh throughout the toothed arc of sector gear 24 to the position of Fig. 9. At this latter position, the trailing end of the toothed arc of the sector gear 24 is at its final position in mesh with the teeth of the driving gear 23 and the driving shoulder 44c engages the cam follower 38 to rotate the sector gear 24 from the region of mesh to the rest position of Fig. 1.

The curvature of the driving shoulder 44c is determined so that as the latter engages the cam follower 38, the speed of rotation of the sector gear 24 is gradually decelerated as it is rotated from its final position in mesh to the rest position.

Figure 8:
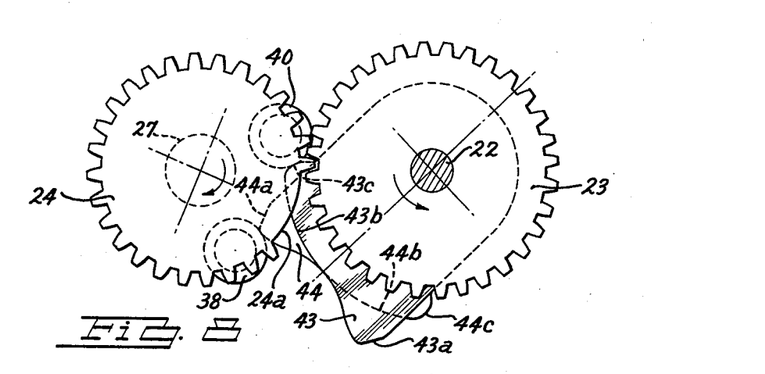
Fig. 8 is a view similar to Fig. 7, showing the sector gear adjacent its initial angular position in mesh with the driving gear.
Figure 9:
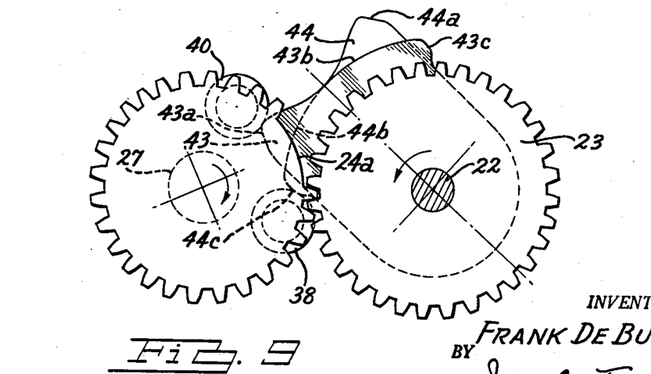
Fig. 9 is a view similar to Fig. 7, showing the sector gear adjacent its final angular position in mesh with the driving gear.
Figure 10:
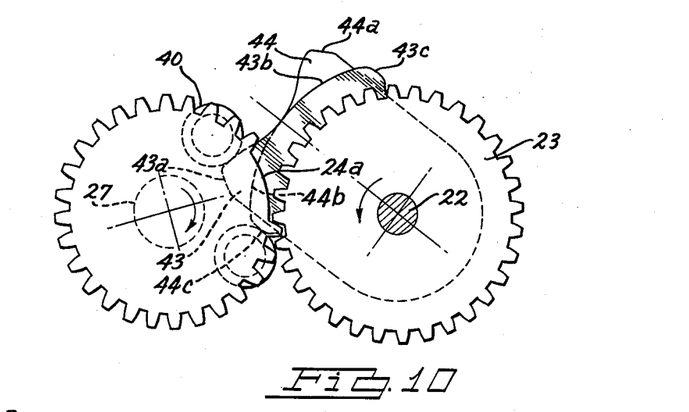
Fig. 10 is a view similar to Fig. 7, showing the sector gear at an angular position advanced slightly from its position of Fig. 9 toward its rest or dwell position.

Simultaneously as the driving projection 44a engages the cam follower 38, Fig. 7, the cam follower 40 rolls into engagement with the blocking shoulder 43c, which is curved to permit the above mentioned clockwise acceleration of the sector gear 24 while at all times maintaining rolling engagement with the cam follower 40 to block the sector gear 24 positively against overriding the driving gear, Figs. 7 and 8. Likewise referring to Figs. 9 and 10, upon the above described deceleration of sector gear 24 as cam follower 38 rides along the driving projection 44c toward the blocking portion 44b, the blocking projection 43a moves into rolling engagement with the cam follower 40 in advance thereof, thereby to lock the gradually decelerating sector gear 24 from overriding the driving gear 23. By the time the cam follower 38 rides onto the locking portion 44b, the cam follower 40 also rolls onto the locking portion 43b, whereupon the sector gear 24 is locked at its rest position and rotation of the driving gear independently of the sector gear to the position of Fig. 1 is permitted.

Thus upon each complete counterclockwise revolution of the driving gear 23, the sector gear 24 is caused to make one complete clockwise revolution. The latter in turn being keyed to the shaft 27 causes one clockwise revolution of the table driving index gear 28 in mesh with the ring gear 29, causing one clockwise indexing movement of the top 10. By virtue of the accelerating and decelerating action of the cams 43 and 44 engaging the cam followers 40 and 38 respectively, the heavy table 10 with its work load thereon is gradually started and stopped at the beginning and ending of each indexing movement. Although the operation has been described in terms of counterclockwise rotation of driving gear 23, it is apparent in view of the symmetry of the cams 43 and 44 that a similar acceleration and deceleration of sector gear 24 will be achieved when the driving gear 23 is rotated clockwise by a reverse operation of motor 15. In the latter situation the cams 43 and 44 will become the driving and blocking cams respectively and the indexing movement of the top 10 will be counterclockwise.

In order to cooperate with the accelerating and decelerating action of the cams 43 and 44 and to enhance the smoothness of operation in starting and stopping the table 10 during each indexing movement, power control means are provided which gradually decrease or increase the rate of flow of hydraulic fluid to the motor 15 during the periods of deceleration or acceleration respectively of the sector gear 24. To this end, the gear 21 is keyed coaxially on a vertical shaft 48 journaled in bearings supported by the frame 11, Fig. 2. Keyed coaxially on the shaft 48 below the gear 21 is a generally cylindrical cam hub 49 having a peripheral radially outward opening cam groove 50, Figs. 11 and 12. The portion of the hub 49 above the groove 50 comprises a circular governor cam 51 having a radially opening detent socket 52 in one portion thereof, Fig. 11, and straightened cam portions 53 extending horizontally in opposite directions from the detent socket 52 to the circular portions of the cam 51. A roller 54 having the curvature of the detent socket 52 and adapted to roll on the circular and straightened surfaces of the governor cam 51 is journaled on a vertical pin 55, Fig. 5, supported between vertically spaced yoke arms 56 which comprise the forward end of a cylindrical plunger 57. The latter is reciprocal radially with respect to the cam 51 within an enlarged bore portion of a supporting tubular cylinder 58, which in turn is supported in a body portion 59 of the frame 11. In the forward portion of cylinder 58 are a pair of diametrically opposed upper and lower guide slots 60 within which ride the upper and lower ends of a vertical pin 61 extending through the plunger 57. Accordingly the latter is freely shiftable radially toward and from the governor cam 51 while confined against rotational movement about its own axis.

Extending rearwardly from the plunger 57 and connected therewith is a slide valve member 62 of reduced diameter which is slidably supported within a reduced bore portion of the cylinder 58. A coil spring 63 around the forward end of the slide valve member 62 is under compression between the rear end of the plunger 57 and the annular interior shoulder of the cylinder 58 at the juncture of the enlarged and reduced bore portions thereof, whereby the plunger 57 and roller 54 are yieldingly urged to the left in Fig. 5 radially toward the governor cam 51. An outer annular locating flange 64 of the cylinder 58 is recessed into the frame portion 59 and is confined in position by a valve block 65 suitably secured to the flange 64 and frame portion 59. The block 65 is provided with a horizontal bore 66 sleeved over a rearward projection of the cylinder 58 through which the slide valve member 62 projects coaxially rearwardly.

Inlet and outlet bores 67 and 68 respectively extend vertically into the valve block 65 from the upper surface thereof and terminate in horizontal portions 69 and 70 respectively which open rearwardly from the block 65 and are connected to hydraulic fluid conduits 71 and 72 respectively. Plugs 73 and 74 screw into the upper ends of the bores 67 and 68 respectively to close the latter. Coaxial with the bores 67 and 68 are bores 75 and 76 respectively through the rearward extension of the cylinder 58, the diametrically opposed portions of the bores 75 and 76 opening into and being connected by inwardly opening annular grooves 77 and 78 respectively which encircle the slide valve member 62.

Figure 6:
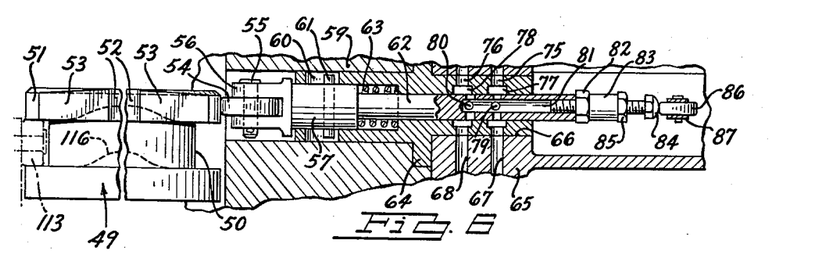
Fig. 6 is a view similar to Fig. 5, showing the governor valve in the open position.

Extending diametrically through the slide valve 62 are one or more inlet bores 79 in communication with the groove 77 when the slide valve 62 is at the rightward position of Fig. 6, whereat the roller 54 is engaged with the circular portion of the governor cam 51. When the slide valve 62 is at the leftward position of Fig. 5, whereat the roller 54 is seated within the detent socket 52, the bores 79 are also shifted to the left to a position intermediate the annular grooves 77 and 78 and not in communication with either of said grooves. Similarly, one or more bores 80 extend diametrically through the slide valve member 62 at a location in communication with the groove 78 regardless whether the slide valve 62 is at the rightward position of Fig. 6 or the leftward position of Fig. 5, or at any intermediate position. The bores 79 and 80 are connected by a horizontal bore 81 extending axially within the slide valve 62 and opening rearwardly therefrom. An end closure screw 82 screws into the rear end of the bore 81 to close the same and is provided with a rearward body portion 83 into which is screwed an adjusting screw 84, The latter is locked in adjusted position by a lock nut 85 screwed tightly against the body portion 83. The head or right end of the screw 84 in Figs. 5 and 6 abuts a roller 86 journaled on the upper end of a horizontally swinging limit switch operating lever 87, which in turn is suitably connected with a limit switch 88 to actuate the same as described below.

The conduit 71 is connected with a suitable source of pressurized hydraulic fluid. The conduit 72 is connected with the supply conduit for the hydraulic motor 15 to operate the latter. Thus when the slide valve 62 is at the position of Fig. 6, hydraulic fluid from the pressure source enters the valve block via conduit 71, flows through bore 69 and the lower portion of bore 75 into channel 77, thence through bores 79, 81, and 80 to the channel 78, thence through the lower portion of bore 68, bore 70 and to the motor 15 via conduit 72. When the slide valve 62 is at the position of Fig. 5, the above described circuit is broken by virtue of the bores 79 being out of communication with the channel 77.

Upon gradual leftward shifting of the slide valve 62 from the position of Fig. 6, as described below, the extent of the communication between the bores 79 and channel 77 is gradually reduced, thereby gradually reducing the flow of fluid to the motor 15 and retarding its operation. In order however to assure a predetermined adjusted minimum flow of hydraulic fluid to the motor 15 at all times regardless of the position of slide valve 62, except when the supply of hydraulic fluid under pressure to conduit 71 is completely shut off, a restricted by-pass conduit 89 connects the upper portions of the bores 67 and 68. A conical needle valve plunger 90 is adjustable with respect to a mating conical valve seat within the conduit 89 by means of an adjusting screw 91 secured to the rear end of the valve plunger 90 and extending rearwardly from the valve block 65. By suitably adjusting screw 91 which is releasably held in adjusted position by lock nut 92, the rate of flow of hydraulic fluid through conduit 89 is adjusted. Accordingly, regardless of the position of slide valve 62, the channels 77 and 78 connect the upper and lower portions of their respective bores 75 and 76 which in turn are in communication via the adjustable by-pass 89.

The gears 20 and 21 are of the same size and rotate at the same angular speed. Upon each revolution of the driving gear 23, the hub 49 and governor cam 51 will likewise complete one revolution. When the sector gear 24 is at the position of Fig. 1 and its toothless portion is centered at the region of mesh with driving gear 23, the roller 54 is seated within detent socket 52, position A, Fig. 11, and the slide valve 62 is at the position of Fig. 5. At this position, the limit switch operating lever 87 is at the left, in Figs. 5 and 6, or forward position in Fig. 1, and the pump supplying hydraulic fluid under pressure to conduit 71 is shut off. Accordingly, no fluid is flowing through conduits 71 and 72 to motor 15, so that worm 13 and both gears 20 and 21 are at rest. When the power is turned on, so as to deliver hydraulic fluid under pressure to conduit 71, a predetermined minimum flow of pressurized hydraulic fluid will pass through conduits 71 and 72 via by-pass conduit 89, causing motor 15 to operate at slow speed. Worm 13 and gears 20 and 21 are thus rotated at slow speed, causing slow rotation of the governor cam 51 and driving gear 23.

Figures 3, 4, 5:
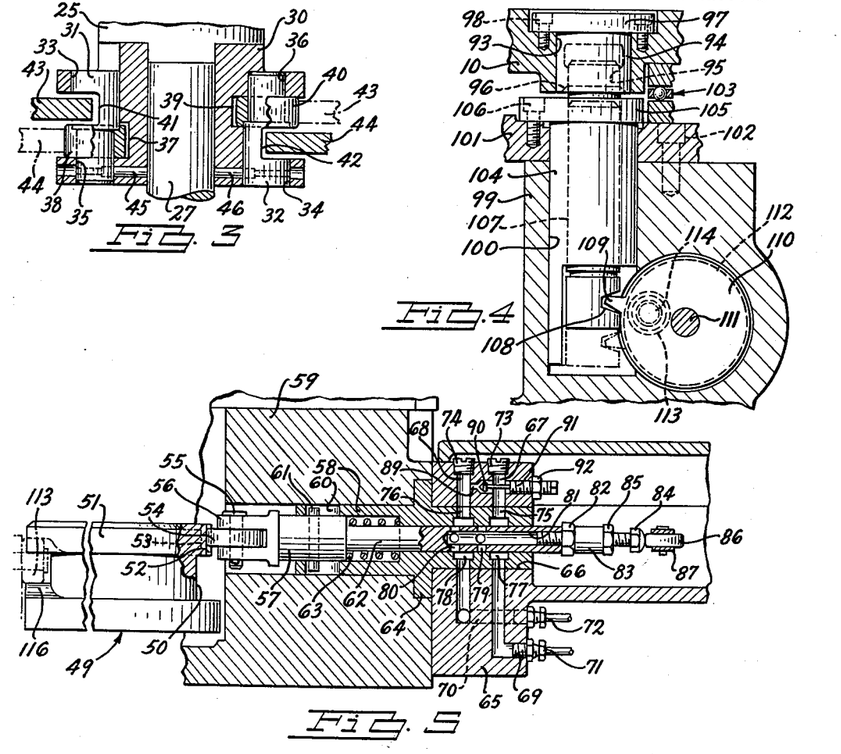
Fig. 3 is a fragmentary enlarged vertical section taken substantially in the direction of the arrows along the broken line 3—3 of Fig. 1.
Fig. 4 is a fragmentary enlarged vertical section taken substantially in the direction of the arrows along the line 4—4 of Fig. 1.
Fig. 5 is a fragmentary enlarged vertical section taken substantially in the direction of the arrows along the line 5—5 of Fig. 1.
Figure 11:
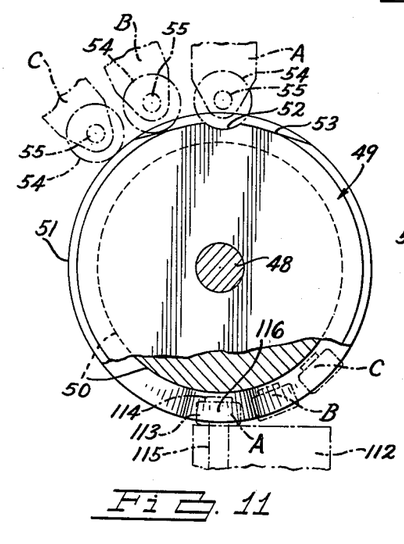
Fig. 11 is a fragmentary enlarged plan view of the governor cam, portions being broken away to show the peripheral cam groove.

Upon clockwise rotation of cam 51, Fig. 11, the roller 54 is moved rearwardly from detent socket 52, or to the right in Fig. 5 and caused to ride along the straightened cam portion 53 at the left in Figs. 1 and 11. As roller 54 moves rearward out of the detent socket 52, limit switch 88 is reset by rearward shifting of its operating arm 87 and a slight initial communication is established between ports 79 and channel 77. Upon continued clockwise rotation of the cam 51, the rate of rearward shifting of slide valve 62 gradually accelerates as roller 54 rides along the straightened portion 53, position B, Fig. 11. In consequence the extent of communication between ports 79 and channel 77 gradually increases, increasing the flow of hydraulic fluid through conduit 72 to motor 15 and gradually accelerating the latter. By the time roller 54 rides onto the cylindrical portion of the governor cam 51, position C, motor 15 has attained top speed.

In the meantime, driving cam portion 44a is rotated with gradually increasing acceleration against the cam follower 38 to rotate the sector gear 24 and table top 10 as described above. It is apparent from the symmetry of the cam portions 53 with respect to the detent socket 52 and the cylindrical cam portions that cam 51 can be rotated in either direction without affecting the operation described.

Upon continued clockwise rotation of gear 21 through approximately one complete revolution, the straightened governor cam portion 53 at the right in Fig. 11 will rotate into contact with the roller 54, permitting gradual shifting of the latter to the left in Fig. 5, thereby gradually restricting the extent of communication between the bores 79 and channel 77. In consequence the flow of hydraulic fluid through conduit 72 is diminished and the speed of motor 15 is decreased. Rotation of worm 13 and gears 20 and 21 are also decreased, causing retarded rotation of the driving gear 23 and sector gear 24. As long as roller 54 is on the straightened portion 53, the minimum flow of hydraulic fluid through conduit 72 can never be less than the predetermined adjustable minimum flow permitted through by-pass conduit 89. When however hub 49 returns to its position of Fig. 1 and roller 54 shifts into detent socket 52, the corresponding movement of limit switch operating lever 87 to the left in Fig. 5 actuates limit switch 88 to completely shut off the pressurized fluid to conduit 71. The motor 15 and the table indexing system will then stop.

In order to locate the top 10 positively at each indexed position, a number of circumferentially spaced indexing bores 93 extend vertically through the top 10. A bushing 94 fits snugly within each bore 93 and is provided with a vertical guide bore 95 having a flared or conically enlarged lower end 96. The upper end of the bushing 94 is flanged at 97 and recessed into the table top 10 so as to lie flush therewith and is secured thereto by bolts 98. Located below the top 10 at the indexed position of one of the bushings 94 is a frame portion 99 of the frame 11 having a vertical bore 100 therein adapted to register coaxially with each of the bores 93 in turn upon successive indexing movements of the top 10.

An annular bearing support 101 is secured on the frame portion 99 by bolts 102 so as to support an annular load carrying bearing assembly 103 interposed between the support 101 and the under side of the top 10. Extending within the bore 100 is a cylindrical bushing 104 having a bore adapted to register coaxially with the bore of each bushing 94 in turn upon successive indexing of the top 10. A flanged head 105 of the bushing 104 is secured to the support 101 by a plurality of bolts 106.

Within the bore of the bushing 104 is a vertically shiftable plunger 107 having a tooth receiving notch 108 at its lower end. A tooth 109 of a vertically pivotal rocker member 110 fits within the notch 108 to shift the plunger 107 vertically upon corresponding pivotal movement of the rocker 110. The latter is keyed to one end of a horizontal shaft 111 journaled on the frame 11 and having a bell crank 112 member keyed on its other end. A roller 113 is rotatably supported eccentrically on the member 112 by a horizontal pin 114 and is adapted to ride within the cam groove 50, Figs. 11 and 12.

Figure 12:
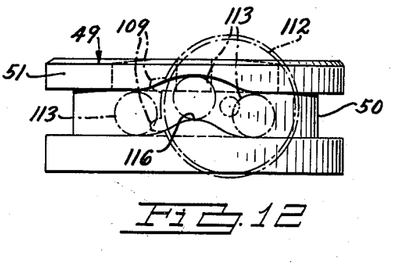
Fig. 12 is an elevational view of the governor cam taken from the front of Fig. 11.

Vertical swinging of the roller 113 in synchronism with movement of the top 10 to an indexed position is accomplished by a raised or elevated portion 116 of the groove 50, Figs. 1 and 12, located with respect to the detent socket 52 and roller 113 so that when roller 54 is located within detent socket 52, roller 113 is at the crest of the raised portion 116, position A, Fig. 11. Accordingly, as hub 49 rotates clockwise from position A to positions B and C, as described above, roller 113 will ride downwardly from the position A to the positions B and C correspondingly, pivoting member 112 and correspondingly rocker 110 so as to swing tooth 109 downwardly and withdraw plunger 107 from within bushing 94. During the rotation of hub 49 required to withdraw plunger 107 from bushing 94, cam followers 38 and 40 are in rolling engagement with the locking portions 44b and 43b respectively, so that no rotation of the sector gear 24 and top 10 takes place.

Upon continued clockwise rotation of hub 49 through substantially one revolution, the elevated portion 116 will return to the roller 113 in synchronism with movement of the sector gear 24 to its rest position, whereat indexing movement of the top 10 stops and the bores of the bushings 94 and 104 are substantially in alignment. Upon continued rotation of hub 49, during which movement the driving gear 23 rotates independently of the sector gear 24 and the cam followers 38 and 40 are in rolling engagement with the locking portions 44b and 43b as aforesaid, roller 113 is lifted by the raised portion 116, causing shaft 107 to move upwardly into the bore of bushing 94. In the event that the plunger 107 and bushing 94 are not in exact axial alignment, the upper end of plunger 107 is chamfered to effect a cam action with the conical flare 96 of the bore of bushing 94, thereby to shift the top 10 exactly to the desired indexed position.

The operation of the indexing table through a complete indexing cycle is summarized starting from one of the indexed positions, Fig. 1, whereat the roller 113 is at the crest of the elevated portion 116, the plunger 107 is seated within the bushing 94, the roller 54 is seated within the detent socket 52, and the slide valve member 62 is at its leftward position whereat the bores 79 are out of communication with the groove 77, and the limit switch actuating member 87 is at its leftward position, whereby conduit 71 is shut off from pressurized fluid by operation of limit switch 88. At this position no hydraulic fluid is supplied to motor 15. The cycle is started by actuating a suitable starting circuit which connects conduit 71 to pressurized hydraulic fluid, causing a small flow of the fluid to motor 15 through conduit 72 via the by-pass 89. Motor 15 is thus operated slowly to rotate worm 13 and thereby to turn gears 20 and 21.

Assuming that the operation of motor 15 is such as to rotate gear 20 and driving gear 23 counterclockwise, gear 21 and hub 49 will rotate clockwise. As the latter rotate clockwise from the position A, roller 54 will move out of the detent socket 52 onto the straightened cam portion 53 at the left and roller 113 will roll downward from the crest of the elevated portion 116. During rotation of the gears 20 and 21 through approximately 9° of arc from their starting positions, Fig. 1, the cam followers 38 and 40 roll along their respective locking cam portions 44b and 43b, holding the sector gear 23 and table 10 immovably at the indexed position for the dwell phase until plunger 107 is withdrawn completely from bushing 94. During the same interval, roller 54 rolls outward along cam portion 53, gradually shifting the slide valve member rightward to establish a slight communication between the bores 79 and groove 77 of the governor valve mechanism, thereby to increase the flow of hydraulic fluid to motor 15, causing the latter to gain operating speed. During continued rotation of gears 20 and 21 through approximately another 9°, the leading edge of driving cam portion 44a moves into driving engagement with cam follower 38 to move sector gear 24 very slowly at first. Simultaneously roller 54 rolls along the straightened cam portion 53 toward the periphery of the circular cam portion 51, gradually shifting slide valve member 62 to the right and increasing the flow of hydraulic fluid through bores 79 to motor 15, causing gradual acceleration of the latter.

Upon continued rotation of gears 20 and 21, the rotation of motor 15 will continue to accelerate as roller 54 moves outward along the straightened cam portion 53. Simultaneously and throughout approximately the next 9° of rotation of driving gear 23, the driving engagement between cam portion 44a and cam follower 38 gradually increases the rate of acceleration of sector gear 24 with respect to the driving gear 23, thereby gradually increasing the rate of acceleration of the indexing movement of top 10. After a total rotation of gears 20 and 21 from the starting position through approximately one-tenth of a complete revolution, roller 54 will ride onto the circular cam portion 51 to cause operation of motor 15 at maximum speed by virtue of optimum flow of hydraulic fluid through conduit 72. At approximately the same time, the toothed portion of section gear 24 will be fully in mesh with the teeth of driving gear 23, whereupon the table 10 will rotate at a constant indexing speed throughout the major portion of the remaining indexing movement. During the approximate last 9° of rotation of the driving gear 23 before the latter is fully in mesh with the toothed portion of sector gear 24, the rate of acceleration of the sector gear 24 with respect to gear 23 resulting from the driving engagement of cam 44a with cam follower 38 gradually decreases and finally stops when the driving gear 23 and sector gear 24 rotate into mesh with each other at equal angular velocities.

Upon rotation of gears 20 and 21 to within approximately one-tenth of a complete revolution from their starting positions, Fig. 1, the reverse of the starting cycle takes place. Roller 54 rolls onto the leading edge of the straightened cam portion 53 at the right, causing gradual leftward shifting of slide valve member 62 and gradual diminishing of the extent of communication between bores 79 and grooves 77, thereby gradually decelerating the operation of motor 15. During approximately the next 9° of rotation of gears 20 and 21 after roller 54 rolls onto the straightened cam portion 53, the toothed arc of sector gear 24 rotates out of mesh with the driving gear 23 and the cam shoulder 44c engages cam follower 38 in driving engagement. As cam follower 38 rolls upward along the curved cam surface 44c, the rate of rotation of sector gear 24 and correspondingly of top 10 gradually decreases, slowly at first while driving gear 23 rotates through approximately the first 9° after cam 44c first engages cam follower 38, then more rapidly for the next successive 9° of rotation of driving gear 23, then again more slowly for approximately the next successive 9° of rotation of driving gear 23, until the gears 20 and 21 are within approximately 9° of having completed one revolution. Throughout approximately the next successive 9° of rotation of gears 20 and 21, cam followers 38 and 40 ride on the locking portions 44b and 43b respectively in the dwell phase, locking the sector gear 24 and top 10 at the indexed position. Even before the dwell phase, roller 113 starts its upward movement along the elevated portion 116. After the top 10 reaches the indexed position, plunger 107 moves upwardly into the bushing 94.

Throughout the foregoing deceleration of sector gear 24 with respect to driving gear 23 the operation of motor 15 is also gradually retarded by leftward shifting of bores 79 out of communication with channel 77. Finally as roller 54 begins to move into detent socket 52, motor 15 is operated at the minimum speed permitted by by-pass 89. When roller 54 seats within detent socket 52, limit switch operator 87 moves leftward sufficiently to trip limit switch 88 and completely stop the power or flow of pressurized fluid into conduit 72, completing the indexing cycle.

If the supply of power through conduit 72 to motor 15 is such as to operate the latter so as to rotate gear 20 clockwise, top 10 will of course rotate counterclockwise during an indexing movement, but by virtue of the symmetry of the mechanism illustrated, the gradual acceleration and deceleration will be the same as above described. It is also to be noted that the index gear 28 makes one complete revolution for each indexing cycle, which latter is entirely independent of the length of the indexing movement. The length of the indexing movement of top 10 is dependent only upon the relative dimensions of the index gear 28 and ring gear 29. Accordingly by substituting index gear 28 and ring gear 29 of different diameters and the use of a table top 10 with a plurality of locating bushings 94 properly positioned thereon, the length of each arc of indexing movement can be readily changed without affecting the above described indexing cycle.

Figure 13:
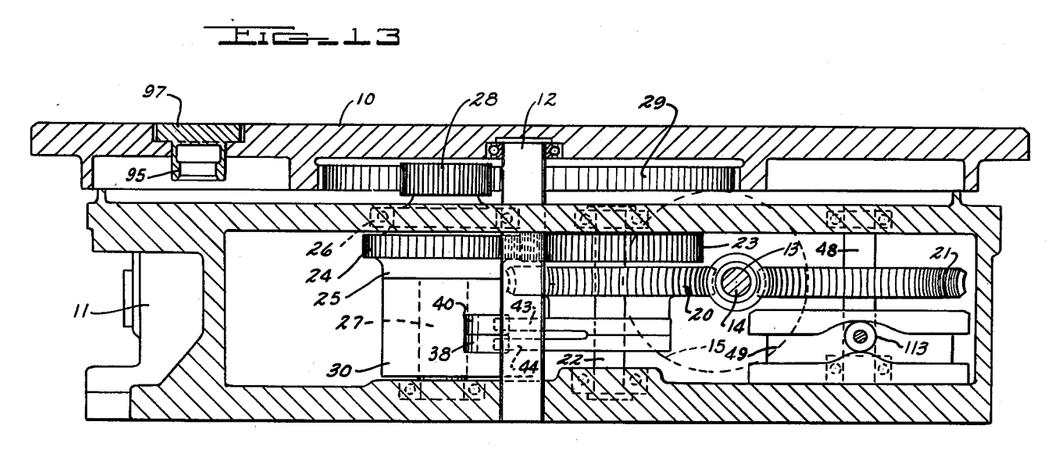
Fig. 13 is an enlarged sectional view similar to Fig. 2 taken on lines 13—13 of Fig. 1.

Fig. 13 of the drawings is an enlarged sectional view taken on lines 13—13 of Fig. 1, which illustrates the table drive mechanism. A rotatable table top 10 is mounted on frame 11 and rotates about a central vertical shaft 12. The means for rotating the table top comprises a horizontal worm gear 13, which is keyed to a coaxial drive shaft 14. Shaft 14 is rotated by a hydraulic motor 15 connected to said shaft.

In mesh with the horizontal gear 13 and at opposite sides thereof, are gears 20 and 21. Gear 20 is secured to shaft 22 and gear 21 to shaft 48. Above gear 20 is a driving gear 23 mounted coaxially on shaft 22. Driving gear 23 has a toothed arc in mesh with the teeth of sector gear 24.

The hub 25 of sector gear 24 is supported above by a bearing 26 mounted in frame member 11. Keyed to shaft 27 above the sector gear 24 is a table driving gear 28 which is in mesh with an index ring gear 29. Ring gear 29 is affixed to the table top 10.

The present invention is so designed, that by removal of table top 10 and substitution of driving gear 28 with a larger or smaller gear and a corresponding change in the table top ring gear 29, a completely new index pattern is obtained. However, no change occurs in the index mechanism itself to accomplish the new and revised index pattern.

I claim:

1. In an indexing table, frame means, a top rotatable on said frame means, sector and driving gears rotatable on said frame means, the sector gear having a toothed arc rotatable in mesh with the teeth of the driving gear, power operated means for rotating the driving gear, means for rotating said sector gear upon rotating said driving gear when said gears are out of mesh comprising a cam connected with said driving gear and also comprising a cam follower connected with said sector gear, said cam follower projecting into the path of movement of driving portions of said cam when said sector gear is at angular positions out of mesh measured in its direction of rotation from adjacent its final position in mesh to a rest position intermediate its final and initial positions in mesh and also projecting into the path of movement of other driving portions of said cam when said sector gear is at other angular positions out of mesh measured in its direction of rotation from said rest position to said initial position in mesh, means to block said sector gear from overriding said driving gear when said gears are out of mesh comprising a second cam connected with said driving gear, and a second cam follower connected with said sector gear, said second cam having blocking portions projecting into the path of movement of said second cam follower when said sector gear is at said first named angular positions and having other blocking portions projections into the path of said second cam follower when said sector gear is at said other angular positions, and means connecting said sector gear and table to rotate the latter upon rotation of said sector gear.

2. The combination in an indexing table as set forth in claim 1 and comprising in addition power control means connected with said power operated means to operate in synchronism with said driving and sector gears and having portions effective to decrease the power to said power operated means gradually upon rotation of said sector gear toward said rest position, said power control means having other portions effective to shut off said power at a predetermined position of said driving gear when said sector gear is at said rest position and having still other portions effective to increase said power gradually upon rotation of said sector gear from said rest position.

3. The combination in an indexing table as set forth in claim 1 and in addition said first named cam having guide portions intermediate its first named driving portions and its other driving portions and concentric with said driving gear and tangent to said first named cam follower when said sector gear is at said rest position, said second cam having guide portions intermediate its first named blocking portions and its other blocking portions and concentric with said driving gear and tangent to said second cam follower when said sector gear is at said rest position, thereby to lock said sector gear at said rest position during limited rotation of said driving gear.

4. In an indexing table, frame means, a top rotatable on said frame means, sector and driving gears rotatable on said frame means, the sector gear having a toothed arc rotatable in mesh with the teeth of the driving gear, power operated means for rotating the driving gear, interengaging driving and driven cam means connected with said driving and sector gears respectively and having portions engageable to rotate said sector gear at a decelerating rate from its final position in mesh with said driving gear to a rest position out of mesh and intermediate its final and initial positions in mesh with said driving gear, said cam means having other portions engageable to rotate said sector gear at an accelerating rate from said rest position to its initial position in mesh with said driving gear, the driving cam means also having portions concentric with said driving gear and in tangential engagement with arcuately spaced portions of the driven cam means when the sector gear is at the rest position, thereby to lock the sector gear at said rest position during limited rotation of the driving gear, power governor means synchronized with the rotation of said driving and sector gears for gradually reducing or increasing the power to said power operated means upon rotation of the sector gear respectively toward or from said rest position, power supply means by-passing said governor means for supplying power to said power operated means at a predetermined rate independently of said governor means, and means synchronized with the rotation of said gears for completely shutting off said power when said driving gear is at a predetermined position and said sector gear is at said rest position.

5. In an indexing table having a rotatable top, a driving gear, a rotatable governor cam, hydraulic power operated means connected with said gear and cam to rotate the same in unison, a sector gear having a toothed arc engageable in mesh with said driving gear to be rotated thereby, a driving cam and a blocking cam keyed to portions rotatable with said driving gear to rotate therewith, a driven cam follower and a blocking cam follower comprising arcuately spaced rollers journaled on portions keyed to said sector gear to rotate therewith, said driven cam follower being in the path of portions of said driving cam when said sector gear is at and intermediate its final position in mesh with said driving gear and a rest position, said sector gear at its rest position being out of mesh and intermediate its final and initial positions in mesh with said driving gear, said driven cam follower being in the path of other portions of said driving cam when said sector gear is at and intermediate said rest position and said initial position in mesh, said blocking cam having arcuately spaced portions engageable with the blocking cam follower in advance thereof when said sector gear is rotated by engagement between said driven cam follower and the first named and other portions respectively of said driving cam, the driving cam having concentric guide portions spacing said first named and other portions, said blocking cam having guide portions spacing its arcuately spaced portions, the guide portions of said driving and blocking cams being tangent to said driven and blocking cam followers respectively when said sector gear is at said rest position, operative power control means for controlling the rate of flow of hydraulic power to said power operated means including shiftable valve means, said governor cam having portions in contact with portions of said power control means for gradually shifting said valve means to decrease said flow of hydraulic power gradually upon rotation of said sector gear to said rest position and having other portions in contact with portions of said power control means for gradually shifting said valve means to increase said flow of hydraulic power gradually upon rotation of said sector gear from said rest position.

6. The combination in an indexing table as set forth in claim 5 and being further characterized in that the portions of said driving cam engaging said driven cam follower lie on a curve effective to decelerate said sector gear gradually from its final position in mesh to its rest position and to accelerate said sector gear gradually from its rest position to its initial position in mesh, said power control means also including shiftable power shut-off means, and said governor cam having still other portions arranged to contact portions of said power control means to shift said power shut-off means to shut off said hydraulic power when said sector gear is at said rest position and said driving gear is at a predetermined angular position.

7. The combination in an indexing table as set forth in claim 6 and comprising in addition conduit means bypassing said valve means for supplying a predetermined minimum flow of hydraulic power to said power operated means independently of said valve means.

8. In an indexing table, frame means, an interchangeable table top rotatable on said frame means, sector and driving gears rotatable on said frame means, said sector gear having a rotatable toothed arc in mesh with the teeth of said driving gear, cam means connected with said driving gear and said sector gear respectively said driving gear having portions engageable to rotate said sector gear from its final position in mesh to a rest position out of mesh intermediate its final initial position in mesh, said cam means having other portions engageable to rotate said sector gear from said rest position to its initial position in mesh with said driving gear, means connecting said sector gear and interchangeable table top to rotate said table top upon rotation of said sector gear, power operated means for rotating said driving gear, control means synchronized with said driving gear and said sector gear effective to accelerate or decelerate said table top upon rotation of said driving gear and said sector gear, other portions of said control means effective to shut off said power operated means at a predetermined position of said driving gear when said sector gear is at a rest position.

9. In an indexing table, frame means, an interchangeable top rotatable on said frame means, rotatable sector and driving gears on said frame means (the sector gear having a toothed arc, said toothed arc cooperable to be in mesh with the teeth of said driving gear, interengaging driving and driven cam means, said driving and driven cam means connected with said driving and sector gears respectively and having portions engageable to rotate and advance said sector gear from its final position in mesh with said driving gear to a rest position out of mesh and intermediate its final and initial position in mesh with said driving gear, said cam means having other portions engageable to rotate said sector gear from a rest position to its initial position in mesh with said driving gear, an interchangeable ring gear secured coaxially to said table top, an interchangeable index gear cooperable with said interchangeable ring gear to accelerate said table top, and means operatively connecting said sector gear and index gear to rotate said index gear one revolution and thereby advance said ring gear and said table top one station upon each rotation of said index gear and sector gear, said table top accelerating through the first 9 degrees movement of said index gear and decelerating throughout the last 9 degrees while maintaining a constant velocity in the interim.

References Cited in the file of this patent

UNITED STATES PATENTS

| 363,776 | Sweet | May 24, 1887 |
| 2,011,488 | Swahnberg | Aug. 13, 1935 |
| 2,192,908 | Harrold et al. | Mar. 12, 1940 |
| 2,192,916 | Kaddeland | Mar. 12, 1940 |
| 2,443,278 | Stratton | June 15, 1948 |
| 2,589,486 | Emrick | Mar. 18, 1952 |
| 2,797,589 | Chaveneaud | July 2, 1957 |

FOREIGN PATENTS

| 63,550 | France | Apr. 13, 1955 |